UNITED STATES PATENT OFFICE.

WILLIAM YOUNG ROCHESTER, OF OTTAWA, AND JOHN McARTHUR, OF NEPEAU, CANADA; SAID McARTHUR ASSIGNOR TO GEORGE ROCHESTER, OF NEPEAU, CANADA.

DYNAMITE AND PROCESS OF MAKING SAME.

SPECIFICATION forming part of Letters Patent No. 517,396, dated March 27, 1894.

Application filed July 10, 1893. Serial No. 480,040. (No specimens.) Patented in Canada October 6, 1892, No. 40,566.

*To all whom it may concern:*

Be it known that we, WILLIAM YOUNG ROCHESTER, residing at Ottawa, and JOHN McARTHUR, residing in the township of Nepeau, in the county of Carleton and Province of Ontario, Canada, subjects of the Queen of Great Britain, have invented certain new and useful Improvements in Processes of and Composition for the Manufacture of Dynamite, (for which we have obtained a patent in Canada, No. 40,566, dated October 6, 1892;) and we do declare the following to be a full, clear, and exact description of the invention, such as will enable others skilled in the art to which it appertains to make and use the same.

This invention relates to a process of and composition for the manufacture of dynamite, and the novelty will be fully understood from the following description and claims.

An objection heretofore experienced in the explosion of dynamite shells, has been that the rising of the obnoxious gases has produced sickness among the workmen in the mines.

The object of our invention is to do away with these objectionable features and to produce a dynamite from which there will be no disagreeable odor arising on its explosion.

We will describe our process, as used to make up a batch of one hundred pounds of dynamite, of thirty-five per cent. grade, and by stating the proportions of ingredients thus used, the changes in such proportions will be obvious to those skilled in the art, in making up a batch of greater or less quantity.

In carrying out the process we take seventeen and one half pounds of whiting; fourteen pounds of coal; two pounds of slaked lime; one pound of pulverized copperas; and thirty-one and one half pounds of nitrate of soda, and prepare them in the usual manner and place them in the mixing pan. We then take one and three fourth ounces of gum camphor and sufficient alcohol or rectified spirits to dissolve it after which we take one and three fourths ounces of carbonate of ammonia and sufficient water to dissolve it. We then take the gum camphor dissolved in alcohol and the carbonate of ammonia dissolved in water, and gradually mix them together and after mixing them well together, we sprinkle them over the absorbents as above prepared, and after thoroughly mixing the whole batch, we add thirty-five pounds of nitro-glycerine and mix thoroughly.

It will be observed that the advantages pointed out are due to the combined use of the whiting, gum camphor, rectified spirits, carbonate of ammonia, as dissolved in water, and pulverized copperas.

Having described our invention, what we claim is—

1. The process of manufacturing dynamite, consisting in mixing together, whiting, coal, slaked lime, copperas, and nitrate of soda, then dissolving gum camphor in alcohol or rectified spirits, then dissolving the carbonate of ammonia in water, then mixing the gum camphor and carbonate of ammonia thus dissolved together, then sprinkling such combined gum camphor, alcohol, carbonate of ammonia, and water, over the combined whiting, coal, slaked lime, pulverized copperas, and nitrate of soda; finally adding nitro-glycerine, and then mixing the whole together in the proportions and manner substantially as specified.

2. A dynamite composed of nitro-glycerine, whiting, coal, slaked lime, pulverized copperas, nitrate of soda, gum camphor, alcohol or rectified spirits, carbonate of ammonia, and water, combined in the proportions substantially as specified.

3. The composition to be used as an absorbent of nitro-glycerine, consisting of copperas, gum camphor, alcohol, carbonate of ammonia, water, and whiting, combined in the proportions, substantially as specified.

In testimony whereof we affix our signatures in presence of two witnesses.

WILLIAM YOUNG ROCHESTER.
JOHN McARTHUR.

Witnesses:
C. H. CLENDENNING,
EDWARD C. PERRAS.